United States Patent [19]

Halttunen et al.

[11] Patent Number: 5,708,707
[45] Date of Patent: Jan. 13, 1998

[54] TELEPHONE HOLDER

[75] Inventors: Mikko Halttunen, Oulu; Paul Sofield, Halikko, both of Finland

[73] Assignee: Nokia Mobile Phones Limited, Salo, Finland

[21] Appl. No.: 588,001

[22] Filed: Jan. 17, 1996

[30] Foreign Application Priority Data

Jan. 20, 1995 [FI] Finland ................................. 950237

[51] Int. Cl.⁶ .................................................. H04M 1/00
[52] U.S. Cl. ................................. 379/446; 379/455
[58] Field of Search ........................... 379/446, 449, 379/426, 454, 455, 428

[56] References Cited

U.S. PATENT DOCUMENTS

| | | | |
|---|---|---|---|
| 4,957,264 | 9/1990 | Hakanen | 248/510 |
| 5,016,851 | 5/1991 | Koskinen et al. | 248/278 |
| 5,040,712 | 8/1991 | Personen et al. | 224/42.45 |
| 5,121,863 | 6/1992 | Kotitalo et al. | 224/42.45 |
| 5,189,698 | 2/1993 | Hakanen | 379/455 |
| 5,230,016 | 7/1993 | Yasuda | 379/58 |

FOREIGN PATENT DOCUMENTS

| | | | |
|---|---|---|---|
| 0585011 A1 | 3/1994 | European Pat. Off. | |
| 701 357 A2 | 3/1996 | European Pat. Off. | |
| 37 41 830 A1 | 6/1989 | Germany. | |
| 89 07 786.5 | 9/1989 | Germany. | |
| 41 07 995 A1 | 9/1992 | Germany. | |
| 41 07 996 A1 | 9/1992 | Germany. | |
| 42 25 741 A1 | 9/1993 | Germany. | |
| 94 09 902.2 | 10/1994 | Germany. | |
| 94 10 547.2 | 10/1994 | Germany. | |
| 5-211548 | 8/1993 | Japan | 379/446 |
| 2 286 744 | 8/1995 | United Kingdom. | |

OTHER PUBLICATIONS

Patent Abstracts of Japan: vol. 15, No. 94 (E–1041), 6 Mar. 1991 & JP-A-02 305156 (Matsushita), 18 Dec. 1990.

*Primary Examiner*—Jack K. Chiang
*Attorney, Agent, or Firm*—Perman & Green, LLP

[57] ABSTRACT

A telephone holder according to the present invention includes a carrier (101) and a body (102), which are able to move vertically in relation to each other between two extreme positions. In the first extreme position an electrical connector of the telephone (111) is galvanically connected to a counterpart (109) of the connector in the holder. In the second extreme position the connector is disconnected from the counterpart. The carrier is joined to the body by means of slide surfaces (103, 104), which permit the carrier to move back and forth vertically in relation to the body between said extreme positions. The movement and its extent are governed by springs (106), for example. The holder according to the present invention can be accurately formed according to the contours of the telephone (111), preventing the telephone from moving laterally while in the holder, facilitating alignment of the connector with the counterpart (109).

10 Claims, 2 Drawing Sheets

TELEPHONE HOLDER

The invention is related to a telephone holder that consists of at least two parts, one part being at least partly within the other, which form the body of the holder and a carrier into which the telephone can be placed. The carrier can be moved in relation to the body between two extreme positions, in which first position the telephone is locked to the holder and the carrier is locked to the body, and in which second position the locking is released. The holder has locking means for performing said locking and releasing.

The accessories of a mobile telephone include a holder into which the telephone can be firmly locked in place, for example, in a car, when the telephone is not being used. Finnish patent number 89650 presents a telephone holder consisting of two parts that are hinged together. A carrier, into which the telephone is placed, can be swivelled in relation to the body, between two extreme positions. The telephone is placed in the holder while the holder is in a so-called open position. When the carrier is turned to a locking position, locking means of the holder lock the telephone to the holder and the parts of the holder to each other. The telephone is locked to the holder by means of pinching. The locking means may consist of flexible tabs, for example, whose tips become wedged into slots in the telephone when the telephone is turned to the locking position. Locking can be released by squeezing a spring-loaded latch, for example, causing the tips of the tabs to be released from said slots. Releasing the locking also permits the carrier to swivel back to the open position. The swivelling movement not only provides the locking function, but also increases the ergonomics of the holder. By making the holder more user-accessible, it is easier to place the telephone in the holder and remove it from the holder.

The telephone holder may also contain a connector, which is a counterpart to an electrical connector of the telephone. The counterpart makes it possible to connect the telephone to other devices, such as a car antenna, a charging device or a microcomputer, when the telephone is in the holder. In placing the telephone in the holder, the electrical connector of the telephone is aligned with the counterpart and pressed into place to produce a galvanic connection. The counterpart to the connector typically forms a projection at the bottom of the holder. This type of holder, manufactured by the applicant, is commercially available. There are problems associated with said holders, which are caused by said projection. It is difficult to accurately align the connector of the telephone with the projection formed by the counterpart. As a result, mechanical stress is exerted on the holder and the telephone when the connector is being pressed into the counterpart. This may damage both the connector and the counterpart, or the counterpart may be loosened from its fastening point. The projection formed by the counterpart also gets dirty easily, making it difficult to press the connector in place. Dirt may also prevent galvanic connection.

The object of the present invention is to design a telephone holder equipped with a counterpart to an electrical connector, which is sturdy, simple to manufacture and free of the problems described above. The present invention is characterized by what is presented in claim 1.

The carrier and body of the holder according to the invention are able to move vertically in relation to each other between two extreme positions, in which first position the electrical connector of the telephone is galvanically connected to the counterpart, and in which second position the connector is disconnected from the counterpart. The carrier of the holder has a planar supporting part that follows the contour of the bottom of the telephone, and which supports at least the part of the telephone that includes the electrical connector. The counterpart to the connector is fastened to the bottom of the body of the holder. In the invention, the carrier is joined to the body by means of slide surfaces that permit the carrier to move back and forth in a vertical direction in relation to the body between said extreme positions. In the first extreme lower position the telephone is locked to the holder and the carrier is locked to the body. Locking can be realized with locking means presented in the general part of the present application, for example. A holder according to the invention can be shaped exactly according to the contours of the telephone, preventing the telephone from moving laterally, thereby facilitating alignment of the connector with the counterpart.

In an advantageous embodiment there are one or more springs between the bottom surface of the supporting part of the carrier and the bottom of the body, which are compressed when the holder is locked in the first extreme position, and which, when locking is released, lift the carrier in relation to the body, keeping the connector and counterpart apart from each other. When locking is released, the projection formed by the counterpart of the connector remains hidden between the body and the carrier, eliminating external stress on the projection. It is advantageous to locate the springs symmetrically in relation to the projection, so that the pushing force of the springs will be evenly transmitted to the telephone by the carrier.

The present invention is described in detail below, with references to the enclosed drawings.

Figure 1:
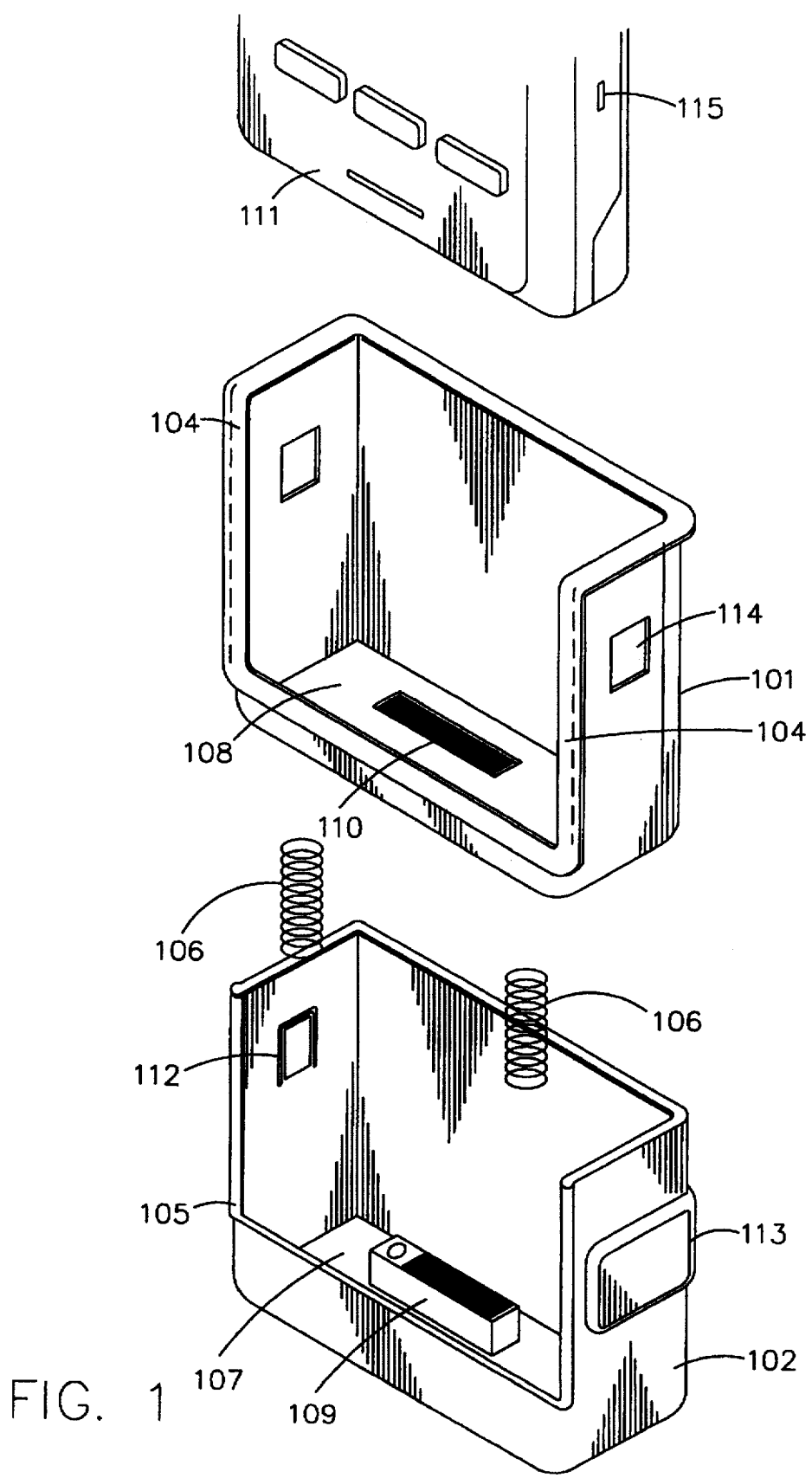
FIG. 1 shows a first telephone holder according to the present invention.

FIG. 1 shows an exploded view of the holder, with dotted lines indicating how the parts of the holder align with each other when the holder is assembled. The holder consists of two parts, with one part being partly within the other: a carrier 101 and a body 102, which for the most part surrounds the carrier 101. The carrier and the body are joined to each other by means of slide surfaces, which consist of a slide rail 103 and a groove 104 (drawn in the figure with a dotted line) formed in the vertical edges or sides of the carrier and the body. The slide surfaces permit the carrier to move back and forth vertically in relation to the body, but prevent lateral movement between the body and the carrier. A horizontal front edge 105 of the body limits downward movement of the carrier. Upward movement can be limited by stops formed in the body and the carrier, for example. A wedge-like slide surface 112 formed in the body and an opening 114 in the carrier that function as locks can also limit upward movement. The extent of movement between the carrier 101 and the body 102 can be adjusted by selecting suitable locations for said limiters.

A counterpart 109 to a connector is fastened to the bottom 107 of the body. A supporting part 108 of the carrier, on which most of the weight of the telephone rests when the telephone is in the holder, has a connector-shaped opening 110 whose location corresponds to the location of the counterpart. The telephone 111 can be locked in the first extreme lower position, in which the electrical connector of the telephone is galvanically connected to the counterpart 109, and the telephone can be released to permit it to return to the second extreme position, in which the connector is disconnected from the counterpart 109. Locking and releasing are performed with locking means, which in this example consist of a slide surface 112 located on the inner surface of the body 102 and a latch 113 located on the outer surface of the body. The carrier 101 has an opening 114 whose location matches that of the slide surface 112. In pressing the telephone 111 into the holder, the slide surface 112 locks into a notch 115 in the telephone through the opening 114. The slide surface 112 may also be fitted with a spring that pushes the slide surface through the opening 114, away from the inner surface of the carrier. Locking can be released by pressing the latch 113, freeing the slide surface 112 from the notch 115. Locking and releasing can also be realized by means of the method described in U.S. Pat. No. 89,650 or by means of some other similar known technique. Springs 106, whose one end is supported by the top surface of the bottom 107 of the body and whose other end is supported by the bottom surface of the supporting base 108 of the carrier, keep the connector and the counterpart apart from each other when locking is released.

Figure 2:
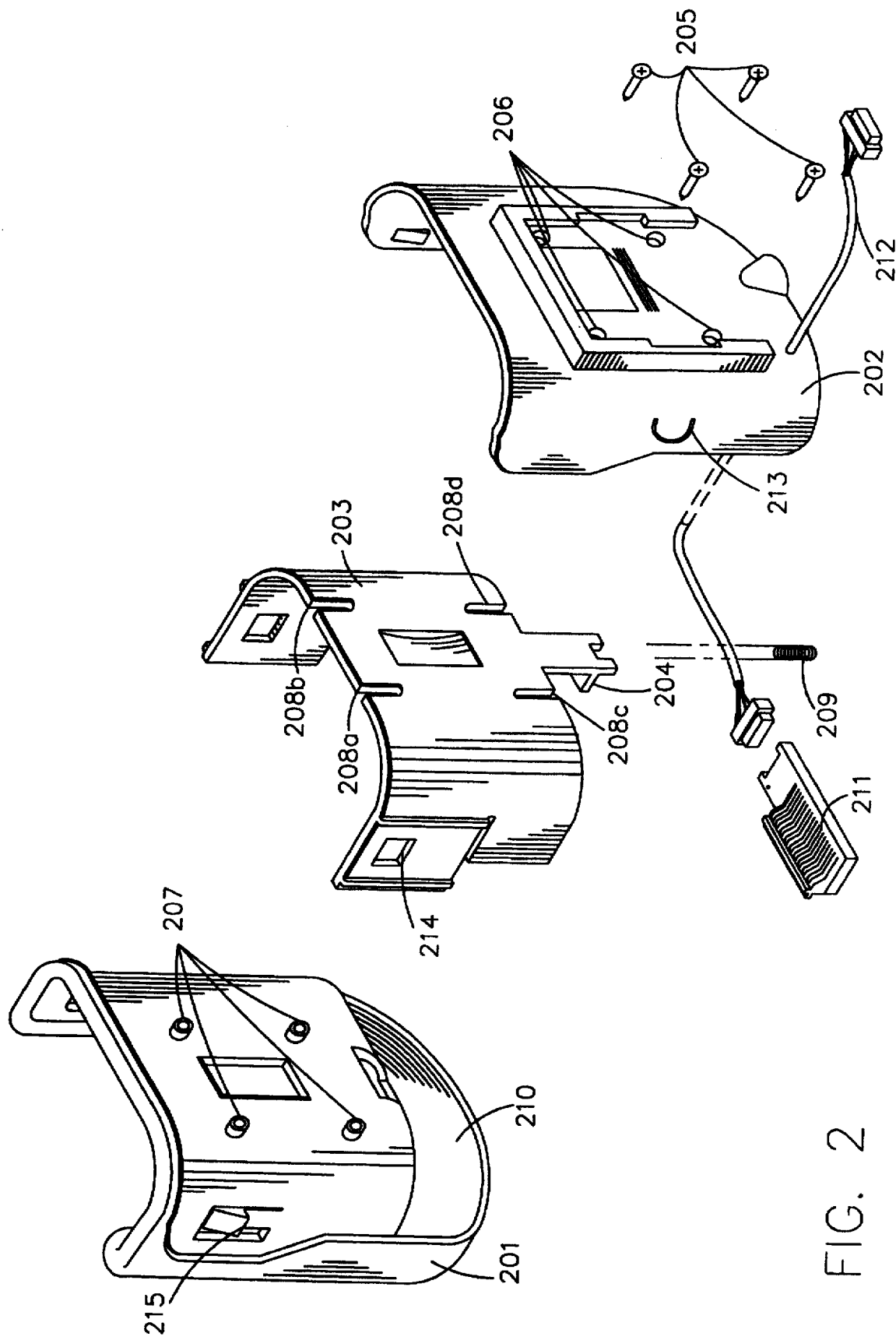
FIG. 2 shows a second telephone holder according to the present invention.

FIG. 2 shows another example of a holder according to the present invention, which consists of three parts. Parts 201 and 202 make up the body of the holder and part 203 functions as a carrier. Part 203 is mainly located between body parts 201 and 202. Part 203 includes a slide-like supporting part 204 that supports the telephone by its bottom when the telephone is in the holder.

In this embodiment, parts 201 and 202, which form the body, are rigidly joined to each other, e.g., with screws 205. Body part 202 has holes 206 for the screws 205 and body part 201 has pins 207 whose location matches that of the holes, and into which the screws 205 are screwed to form a rigid fastening. Space remains between the body parts 201 and 202 for the carrier 203 and its vertical movement in relation to the body. The vertical movement between the carrier 203 and the body parts is implemented by means of slide surfaces, which here consists of the pins 207 and slots 208 in the carrier whose location corresponds to that of the pins. The extent of the movement is governed by the depth of the slots. Downward movement is limited by the slots 208a and 208b at the top edge of the carrier and upward movement is limited by the slots 208c and 208d at the bottom edge of the carrier. Downward movement is dampened and upward movement is assisted by means of a spring 209 located between the top surface of the bottom 210 of the body and the bottom surface of the supporting part 204.

When the telephone is locked in its extreme lower position, the spring 209 is compressed and an electrical connector of the telephone is connected to a counterpart 211. Correspondingly, when locking is released, the connector is disconnected from the counterpart 211 and the spring 209 keeps the carrier in its upper position, whereupon the telephone can easily be removed from the holder. FIG. 2 also shows a connector cable 212 and its connector, which connects to the counterpart 211. In this embodiment, the connector cable 212 passes through a hole in the carrier part 202 for connection to the counterpart.

The telephone is locked to the holder by means of pinching, mentioned earlier, by locking means which consist of at least a latch 213 and a slide surface 215. In locking, the slide surface 215 mates with a notch in the side of the telephone through an opening 214.

In a holder according to the present invention, one side wall of the holder is advantageously open, making it easier to place the telephone in the holder and preventing inadvertent pressing of the keys.

One of the most notable benefits of the vertical movement of the carrier and body in relation to each other according to the present invention, compared to holders of the prior art, is effortless aligning of the connector of the telephone with the counterpart of the connector. In the first embodiment presented above, the opening 110 in the supporting base 108 and the borders it may possibly have can be accurately shaped to follow the contours of the connector of the telephone and the counterpart 109 of the connector, whereupon the connector is effortlessly guided to the counterpart. Alignment is further improved by the shape of the holder, which follows the contours of the telephone, and the joining of the carrier to the body by means of the slide surfaces, which permit only vertical movement, but no lateral movement. Due to good alignment, the connector of the telephone will not wear and no stress will be placed on the counterpart when the telephone is being pressed into place in the holder.

By merit of the spring suspension, connection between the connector and the counterpart can be prevented when the telephone is freed from locking, but is still in the holder. The spring suspension also suitably positions the bottom plate of the carrier, which is fitted with a hole the size of the connector, as a protection for the counterpart when the telephone is not in the holder, thus preventing the counterpart from being contaminated by the surroundings.

As the first of the presented examples indicates, the holder according to the present invention can be assembled from two parts: the body and the carrier. The body 102 and the carrier 101 can be joined by only the slide surfaces 103, 104, whose vertical movement can be governed by springs 106, for example. The construction can be reinforced by means of the construction shown in the second example, which is based on two body parts 201, 202 and one carrier part 203. In this construction, the extent of movement is governed by the depth of the slots 208 in the carrier. The spring 209 keeps the supporting base in the upper position when locking is released.

Plastics are particularly suitable manufacturing materials for the holder according to the present invention, as they can be injection-molded. Assembly of the holder from parts is effortless. The holder is durable, because the shape of the holder, which follows the contours of the telephone, and the limited back-and-forth movement, governed by the slide surfaces, ensure that no lateral forces are exerted on the holder, which could damage the telephone. The holder can be applied to the storage of all types of cordless hand-held telephones.

The holder according to the present invention is not limited to the examples presented above, but said holder can be modified to the extent permitted by the accompanying claims.

We claim:

1. A telephone holder that consists of at least two parts, one part being at least partly within the other; the holder comprising a carrier (101, 203) and a body (102, 201, 202), the carrier and the body can be moved in relation to each other between two extreme positions, in a first position the telephone is locked to the holder and the carrier is locked to the body, and in a second position locking is released, and the holder has locking means (112, 113, 114, 213, 214, 215) for performing said locking and releasing, characterized in that, the carrier (101, 203) has a plane supporting part (108, 204) that supports the telephone by at least one of its surfaces which includes an electrical connector of the telephone, and the body (102, 201, 202) has a counterpart (109, 211) for the electrical connector of the telephone, and the holder has slide surfaces (103, 104, 207, 208) which restrict the carrier to move back and forth vertically in relation to the body between said extreme positions, in which said first position the electrical connector is galvanically connected to the counterpart, and the carrier and the telephone are locked to the body by said locking means in which said second position the connector is disconnected from the counterpart.

2. The holder according to claim 1, characterized in that, the supporting part (108) of the carrier consists of a continuous surface which has an opening (110) for the electrical connector.

3. The holder according to claim 2, characterized in that the opening (110) has borders which function as guides that align the connector with the counterpart.

4. The holder according to claim 1, characterized in that the slide surfaces at least partly consist of a slide rail (103) and a groove (104) which are formed in the sides of the body and the carrier respectively, and said slide rail and said groove intermesh with each other.

5. The holder according to claim 1, characterized in that the body consists of two parts (201, 202) between which the carrier (203) is at least partly situated.

6. The holder according to claim 5, characterized in that the slide surfaces at least partly consist of pins (207) joining parts of the body and oblong slots (208) in the carrier, said pins being located within said oblong slots and said slots being oriented in the direction of movement.

7. The holder according to claim 1 characterized in that the holder includes at least one spring (209), the spring having one end supported by the top surface of the bottom side (210) of the body, and having another end supported by the bottom surface of the supporting part (204) of the carrier located above the body, the spring, is compressed when the carrier is locked in a first extreme position.

8. The holder according to claim 7, characterized in that the holder includes at least two springs (106) that are located symmetrically in relation to the counterpart that is fastened to the body.

9. The holder according to claim 1, characterized in that the locking means consist of at least a tab (112, 215) that locks into notches in the telephone when the telephone is pressed into the holder, and a latch (113, 213) that frees the locking when pressed.

10. The holder according to claim 1, characterized in that when the locking is released, the counterpart (109, 211) is protected between the carrier (101, 203) and the body (102, 201, 202).

* * * * *